June 23, 1959
D. D. WILCOX, JR
2,892,084
PULSE GATING CIRCUIT
Filed Nov. 25, 1957
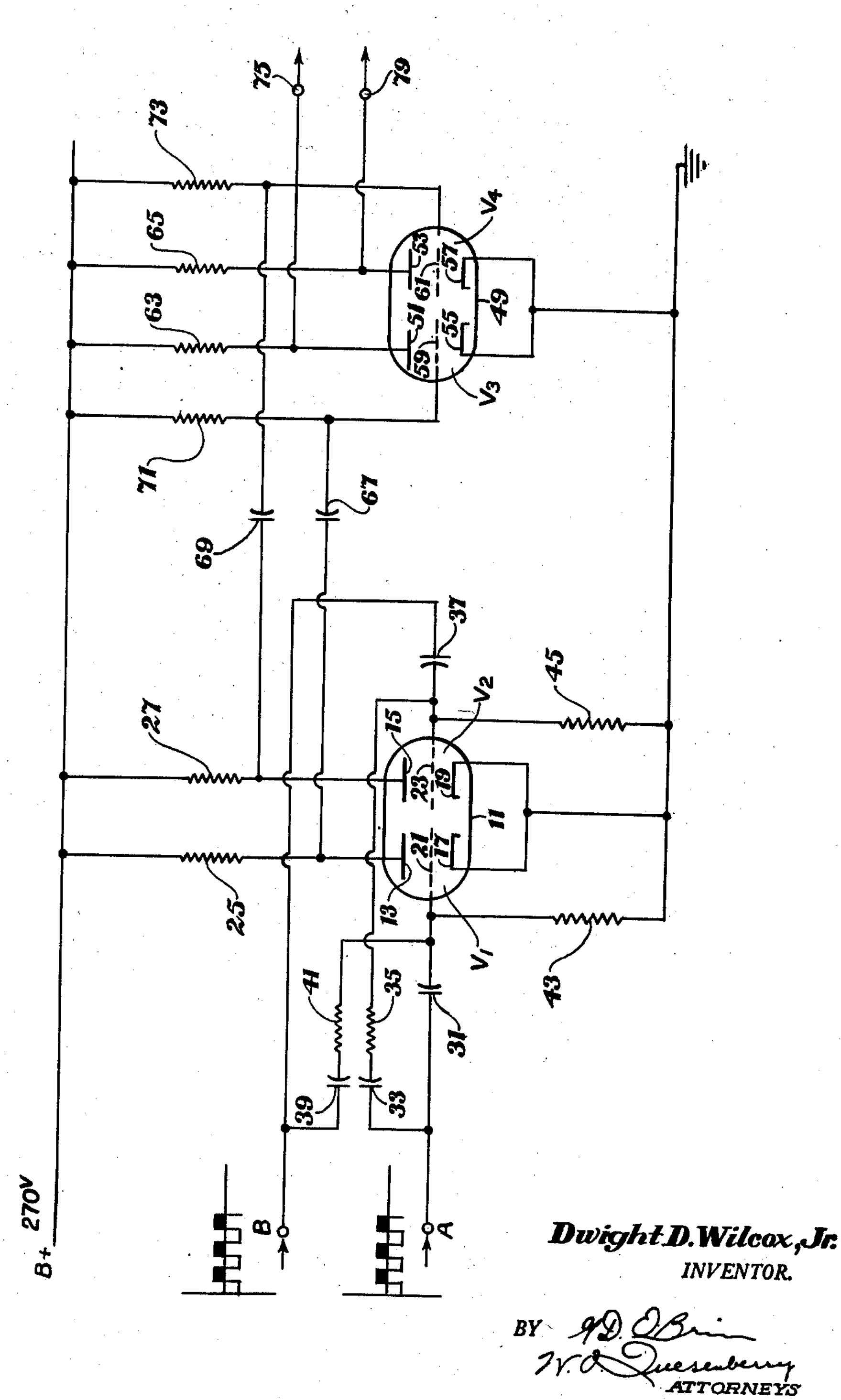
Dwight D. Wilcox, Jr.
INVENTOR.
BY [signature]
[signature]
ATTORNEYS United States Patent Office 2,892,084

Patented June 23, 1959

2,892,084

PULSE GATING CIRCUIT

Dwight D. Wilcox, Jr., Los Altos, Calif., assignor, by mesne assignments, to the United States of America as represented by the Secretary of the Navy Application November 25, 1957, Serial No. 698,870

1 Claim. (Cl. 250—27)

This invention relates to electronic switching circuits and more particularly to pulse gating circuits responsive to electronic input signals which arrive in fixed time relation with other electronic input signals.

The pulse gating circuit of the present invention can be used in the electronic computer switching circuitry where it is desired to arrange plural input networks so that a train of signals on one input will produce corresponding output signals in both output circuits, while trains of signals on each input will produce corresponding output signals in the associated output cricuit only. The pulse gating circuit of the present invention is, therefore, referred to as an "either not both" gating circuit. The gating circuit of the present invention comprises broadly a coupling capacitor for interconnecting one input source of low output impedance signals having a positive peak pulse amplitude to the control grid of an electron discharge tube, another coupling capacitor for interconnecting another input source of low output impedance signals having a positive peak pulse amplitude similar to that of the first mentioned source to the control grid of another electron discharge tube, and means for coupling each of the sources to the control grid of the other electron discharge tube. The cathodes of the electron discharge tubes are interconnected and grounded. The outputs of the tubes are amplified and can be utilized as desired.

The primary object of the present invention is, therefore, to provide a pulse gating circuit in which plural input networks are arranged so that signals on one will produce output signals in both output circuits, while signals on each will produce output signals in the directly associated output circuit only.

Another object of the present invention is to provide a pulse gating circuit in which coupling capacitors are utilized to directly couple first and second sources of low output impedance signals to the control grid of a first and a second electron discharge tube respectively, and in which first and second coupling means interconnect the first and second sources of low output impedance signals to the grid of the second and the first electron discharge tube respectively, whereby signals from either source will cause signals to appear in the output circuit of both electron discharge tubes and signals from each source will cause signals to appear in the output circuit of the directly coupled electron discharge tube only.

Yet another object of the present invention is to provide a pulse gating circuit which is very simple in form utilizing component values which are not critical, and which is relatively inexpensive to produce.

Still other objects and advantages of the present invention will become readily apparent to those skilled in the art from the following description with reference to the drawing in which the sole figure is a schematic wiring diagram illustrating the pulse gating circuit of the present invention.

The pulse gating circuit of the present invention comprises two electron discharge tubes which may be contained within a single envelope as illustrated at 11. The electron discharge tubes may be, for example, triodes $V_1$ and $V_2$ having plates 13 and 15 respectively, cathodes 17 and 19 respectively, and control grids 21 and 23 respectively. A plate suppy voltage source (not shown) is connected to the B+ and ground lines, across the plates and cathodes of the triodes $V_1$ and $V_2$ through the current limiting plate load resistors 25 and 27 respectively. Cathodes 17 and 19 are common and connected to ground. One source (not shown) of low output impedance signals having a positive peak pulse amplitude and having a wave form for example similar to that shown adjacent the terminal at A is directly coupled to the grid 21 of triode $V_1$ through the capacitor 31 and is coupled to the grid 23 of triode $V_2$ through the capacitor 33 and resistor 35 connected in series. A second source (not shown) of low output impedance signals having a positive peak pulse amplitude similar to the amplitude of the signal from the first source and having a wave form, for example, similar to that shown adjacent the terminal at B is directly coupled to the grid 23 of triode $V_2$ through the capacitor 37 and is coupled to the grid 21 of triode $V_1$ through the capacitor 39 and resistor 41 connected in series. Grid leak resistors 43 and 45 are interconnected between grids 21 and 23 respectively to ground.

The output signals from the triodes $V_1$ and $V_2$ may be coupled to any suitable amplifier for amplification. The amplifier illustrated in the drawing comprises two electron discharge tubes, such as for example two triodes $V_3$ and $V_4$ contained within a single envelope as illustrated at 49, said triodes having plates 51 and 53 respectively, cathodes 55 and 57 respectively, and control grids 59 and 61 respectively. The cathodes 55 and 57 are common and connected to ground and the plates 51 and 53 are connected through current limiting resistors 63 and 65 respectively to the B+ line of the plate supply. The output of triode $V_1$ is coupled to the grid 59 of triode $V_3$ through the capacitor 67. The output of triode $V_2$ is coupled to the grid 61 of triode $V_4$ through the capacitor 69. Resistors 71 and 73 are connected between the B+ line of the plate supply and the grids 59 and 61 respectively. The amplified output signals can be sensed across the plate and cathode of the triodes $V_3$ and $V_4$ and may be taken directly from the terminals 75 and 79.

The operation of the pulse gating circuit of the present invention is as follows: with positive peak pulses being applied at A, the grid 21 is made less negative or slightly positive rendering triode $V_1$ conductive. The resulting pulse produced by triode $V_1$ is applied to the grid 59 rendering triode $V_3$ conductive and the resulting amplified output signal appears at 75. The input pulse is also applied to the grid 23 of triode $V_2$ through the capacitor 33 and resistor 35 thereby rendering the triode $V_2$ conductive. The output pulse of triode $V_2$ is applied to the grid 61 of triode $V_4$ and the amplified output signal appears at 79. The output signal which appears at 75 will be similar in amplitude to the signal at 79. Thus, it will be appreciated that with no input signals being applied at B, the input signals applied at A will produce output signals at both 75 and 79. Similarly, with no input signal being applied at A, input signals applied at B will result in output signals of similar amplitude appearing at terminals 75 and 79.

As a result of the input signals applied at A triode $V_1$ is rendered conductive as described above and grid current will flow charging capacitor 31 negatively towards the grid 21. After the input signal applied at A decays, the grid 21 will be driven into the cutoff region by the charge on the capacitor 31 and triode $V_1$ is no longer conductive. Succeeding pulses applied at A will be of sufficient amplitude to overcome the cutoff bias and drive the grid 21 less negative or slightly positive, rendering triode $V_1$ conductive and creating the desired output pulse while maintaining the charge on the capacitor 31. While the capacitor 31 is in its fully charged or nearly fully charged condition, the signals applied at B which are attenuated by the resistor 41, are not able to overcome the cutoff bias and no output signal at 75 will appear from an input signal applied at B, so long as the input signals applied at A occur frequently enough to maintain the capacitor 31 fully charged or nearly fully charged at all times. The time constant for the circuit, that is, the period of time required to discharge the capacitor 31 to a value at which input signals applied at B will cause output signals to appear at 75, may be readily controlled by varying the values of the resistor 43 and capacitor 31.

Similarly, the input signals applied at B render triode $V_2$ conductive and grid current will flow charging capacitor 37 negatively towards the grid 23. When the input signal applied at B decays, the grid 23 will be driven into the cutoff region by the charge remaining on the capacitor 37 and triode $V_2$ is no longer conductive. Succeeding pulses applied at B will be of sufficient amplitude to overcome the cutoff bias rendering the triode conductive and creating the desired output pulse at 79. While the capacitor 37 is in its fully or nearly fully charged condition, the input signals applied at A which are attenuated by the resistor 35, are not able to overcome the cutoff bias and no output signal at 79 will appear from an input signal applied at A so long as the input signals applied at B occur frequently enough to maintain the capacitor 37 fully charged or nearly fully charged at all times. The period of time required to discharge capacitor 37 to a value at which input signals applied at A will cause output signals to appear at 79, may be controlled by varying the values of resistor 45 and capacitor 37.

Typical values of the components utilized in the pulse gating circuit of the present invention and providing very satisfactory results are as follows:

| | |
|---|---|
| Twin triodes $V_1$ and $V_2$ | 6112. |
| Twin triodes $V_3$ and $V_4$ | 6112. |
| $E_{bb}$ | 270 volts. |
| Capacitor **31** and **37** | .047 microfarads. |
| Capacitors **33** and **39** | .01 microfarad. |
| Capacitors **67** and **69** | 470 micromicrofarads. |
| Resistors **25** and **27** | 220,000 ohms. |
| Resistors **35** and **41** | 220,000 ohms. |
| Resistors **43** and **45** | 10 megohms. |
| Resistors **63** and **65** | 100,000 ohms. |
| Resistors **71** and **73** | 1 megohm. |

Input signals at A and at B, 100 volt peak, 1 millisecond wide

Output signals at 75 and 79, 230 volt peak, 300 microseconds wide

While only one embodiment of the present invention has been shown and specifically described, it is realized that modifications and variations are possible and will be readily apparent to those skilled in the art from the foregoing description which is intended to be illustrative only and the scope of the invention is defined in the appended claim.

Having now particularly described my invention, what I desire to secure by Letters Patent of the United States and what I claim is:

An electronic pulse gating circuit for use with first and second sources of low output impedance signals of similar positive peak pulse amplitude comprising first and second electron discharge tubes each having a plate, a cathode and a control grid, first and second output circuits connected to the plates of said first and second tubes respectively, means electrically interconnecting said cathodes for maintaining the potential of said cathodes at a common level, a grid leak path for each tube, the path for each tube including a resistance element connected in series with the grid and cathode of that tube, capacitance means for directly coupling the signals from said first source to the grid of said first tube to control the conduction of said first tube therewith, secondary means for coupling the signals from said first source to the grid of said second tube to control the conduction of said second tube therewith, another capacitance means for directly coupling the signals from said second source to the grid of said second tube to control the conduction of said second tube therewith, and secondary means for coupling the signals from said second source to the grid of said first tube to control the conduction of said first tube therewith, the capacitance means and resistance element directly associated with each tube determining the period of time required for the voltage remaining on the grid of that tube to decay after that tube has stopped conducting, said secondary coupling means each comprising attenuating means connected in series with the signal source and grid associated with said attenuating means, each said attenuating means passing signals sufficient in strength to overcome the voltage remaining on the grid associated therewith only at the end of a predetermined period of time after the tubes have stopped conducting, whereby a signal from either source or simultaneous signals from both sources produce output signals in said first and second circuits and a signal from each source spaced by less than said predetermined period of time produces corresponding signals only in the output circuit of the directly coupled tubes.

References Cited in the file of this patent

UNITED STATES PATENTS 2,524,134 Palmer ---------------- Oct. 3, 1950